(12) United States Patent
Spencer et al.

(10) Patent No.: US 11,687,396 B2
(45) Date of Patent: Jun. 27, 2023

(54) DETERMINING SERVER ERROR TYPES

(71) Applicant: Verizon Patent and Licensing Inc., Basking Ridge, NJ (US)

(72) Inventors: Steve Marshall Spencer, Austin, TX (US); Joseph B. Knaack, Cedar Park, TX (US); Kyle C. Sung, Austin, TX (US); David Holtfrerich, Round Rock, TX (US); Xiaoran Tang, Austin, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 24 days.

(21) Appl. No.: 17/248,655

(22) Filed: Feb. 2, 2021

(65) Prior Publication Data
US 2021/0157666 A1    May 27, 2021

Related U.S. Application Data

(63) Continuation of application No. 16/189,348, filed on Nov. 13, 2018, now Pat. No. 10,922,163.

(51) Int. Cl.
| | | |
|---|---|---|
| *G06F 11/00* | (2006.01) | |
| *G06F 11/07* | (2006.01) | |
| *G06N 20/00* | (2019.01) | |
| *G06N 3/08* | (2023.01) | |
| *G06N 3/04* | (2023.01) | |

(52) U.S. Cl.
CPC ........ *G06F 11/079* (2013.01); *G06F 11/0709* (2013.01); *G06F 11/0751* (2013.01);
(Continued)

(58) Field of Classification Search
CPC ............. G06F 11/0709; G06F 11/0751; G06F 11/076; G06F 11/0766; G06F 11/0769;
(Continued)

(56) References Cited

U.S. PATENT DOCUMENTS

| | | | |
|---|---|---|---|
| 8,209,567 B2* | 6/2012 | Cohen | .................. G06F 16/285 |
| | | | 714/39 |
| 8,452,761 B2 | 5/2013 | Sabato et al. | |

(Continued)

OTHER PUBLICATIONS

Zhang Ke, et al., Automated IT System Failure Prediction: A Deep Learning Approach, 2016, IEEE (Year: 2016).*

(Continued)

*Primary Examiner* — Marc Duncan

(57) ABSTRACT

A device obtains a plurality of server logs from a plurality of servers, where each server log includes a plurality of log entries, and generates, based on the plurality of log entries, a plurality of data structures, where each data structure includes one or more log entries that concern a server request. The device identifies a set of data structures associated with one or more server errors and processes the set of data structures using an artificial intelligence technique to determine a respective classification score of each data structure. The device determines, based on the respective classification score of each data structure, a respective server error type of each data structure, and causes display of information concerning at least one server error type associated with the set of data structures.

20 Claims, 9 Drawing Sheets

(52) U.S. Cl.
CPC ...... *G06F 11/0778* (2013.01); *G06F 11/0787* (2013.01); *G06N 20/00* (2019.01); *G06N 3/04* (2013.01); *G06N 3/08* (2013.01)

(58) Field of Classification Search
CPC ............. G06F 11/0778; G06F 11/0787; G06F 11/3072; G06F 11/3476; G06F 16/2458–2477
See application file for complete search history.

(56) References Cited

U.S. PATENT DOCUMENTS

| | | | |
|---|---|---|---|
| 9,552,263 B2* | 1/2017 | Andre | G06F 11/079 |
| 2003/0097617 A1* | 5/2003 | Goeller | G06F 11/0793 |
| | | | 714/39 |
| 2015/0089309 A1 | 3/2015 | Fu et al. | |
| 2015/0347923 A1* | 12/2015 | Bartley | G06F 11/0709 |
| | | | 706/12 |
| 2019/0095313 A1 | 3/2019 | Xu et al. | |
| 2019/0163594 A1* | 5/2019 | Hayden | G06F 11/079 |
| 2019/0171622 A1 | 6/2019 | Zong et al. | |
| 2020/0034224 A1 | 1/2020 | Nagendra et al. | |
| 2020/0073741 A1 | 3/2020 | Wang et al. | |

OTHER PUBLICATIONS

Kimura, Tasuaki et al., Proactive Failure Detection Learning Generation Patterns of Large-scale Network Logs, 2015, IFIP (Year: 2015).*

\* cited by examiner

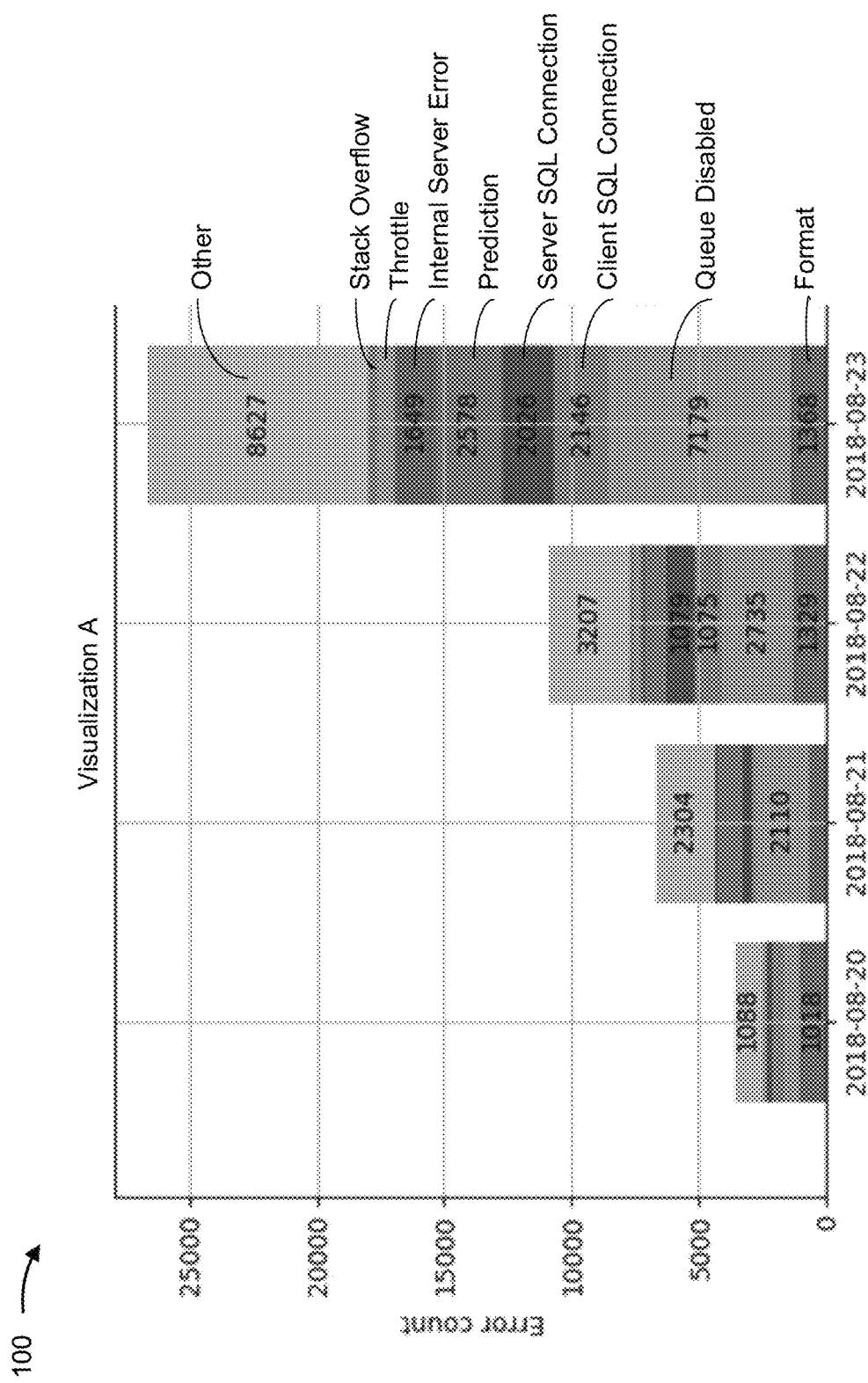

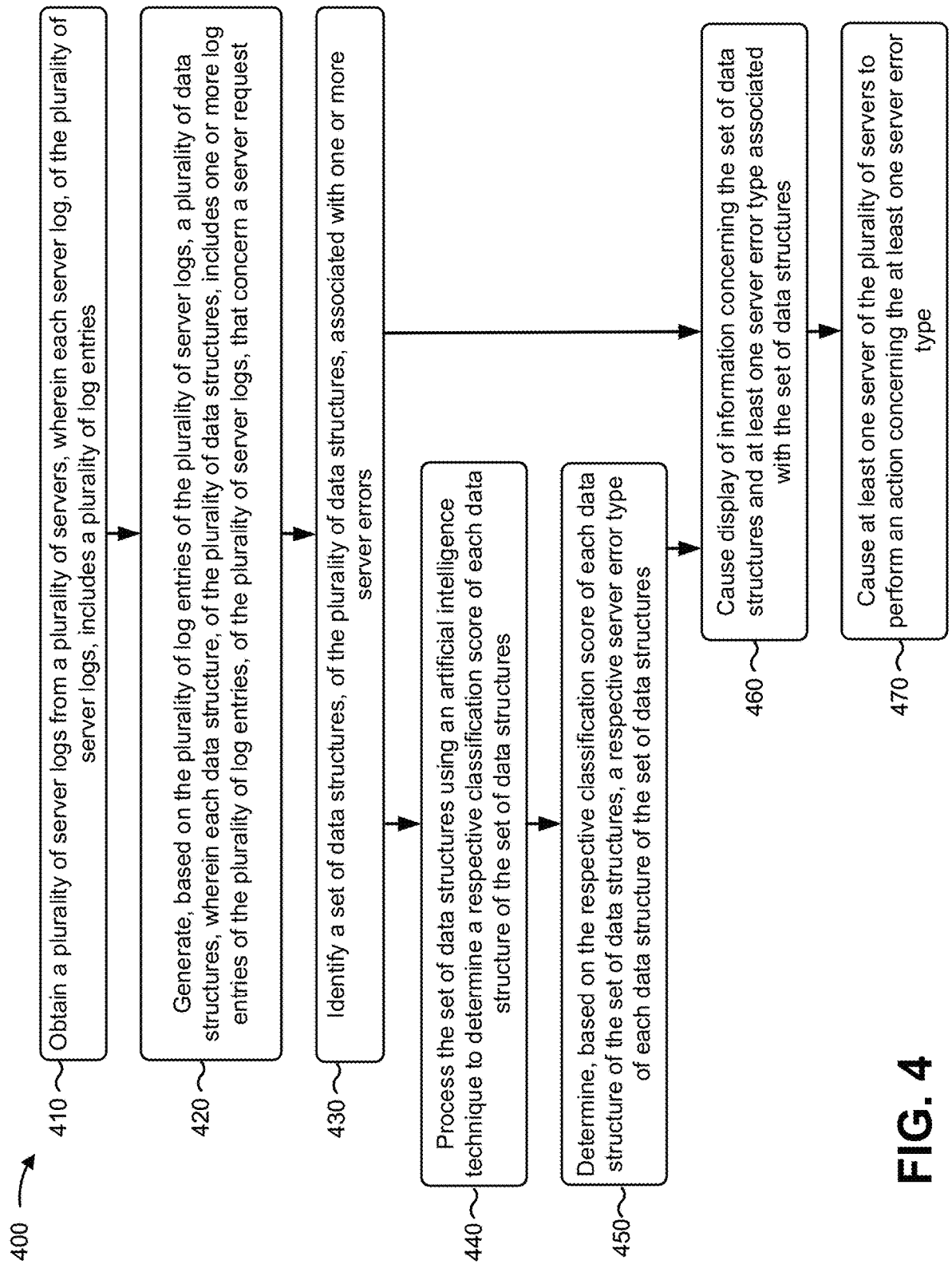

DETERMINING SERVER ERROR TYPES

RELATED APPLICATION

This application is a continuation of U.S. patent application Ser. No. 16/189,348, entitled "DETERMINING SERVER ERROR TYPES," filed Nov. 13, 2018 (now U.S. Pat. No. 10,922,163), which is incorporated herein by reference.

BACKGROUND

A cloud computing environment can include a plurality of server devices that handle multiple, (e.g., tens, hundreds, thousands) of actions simultaneously. When the plurality of server devices experience server errors, the cloud computing environment can be impacted.

BRIEF DESCRIPTION OF THE DRAWINGS

FIGS. 1A-1F are diagrams of an example implementation described herein.

FIG. 4 is a flow chart of an example process for determining server error types.

DETAILED DESCRIPTION OF PREFERRED EMBODIMENTS

Figure 1A:
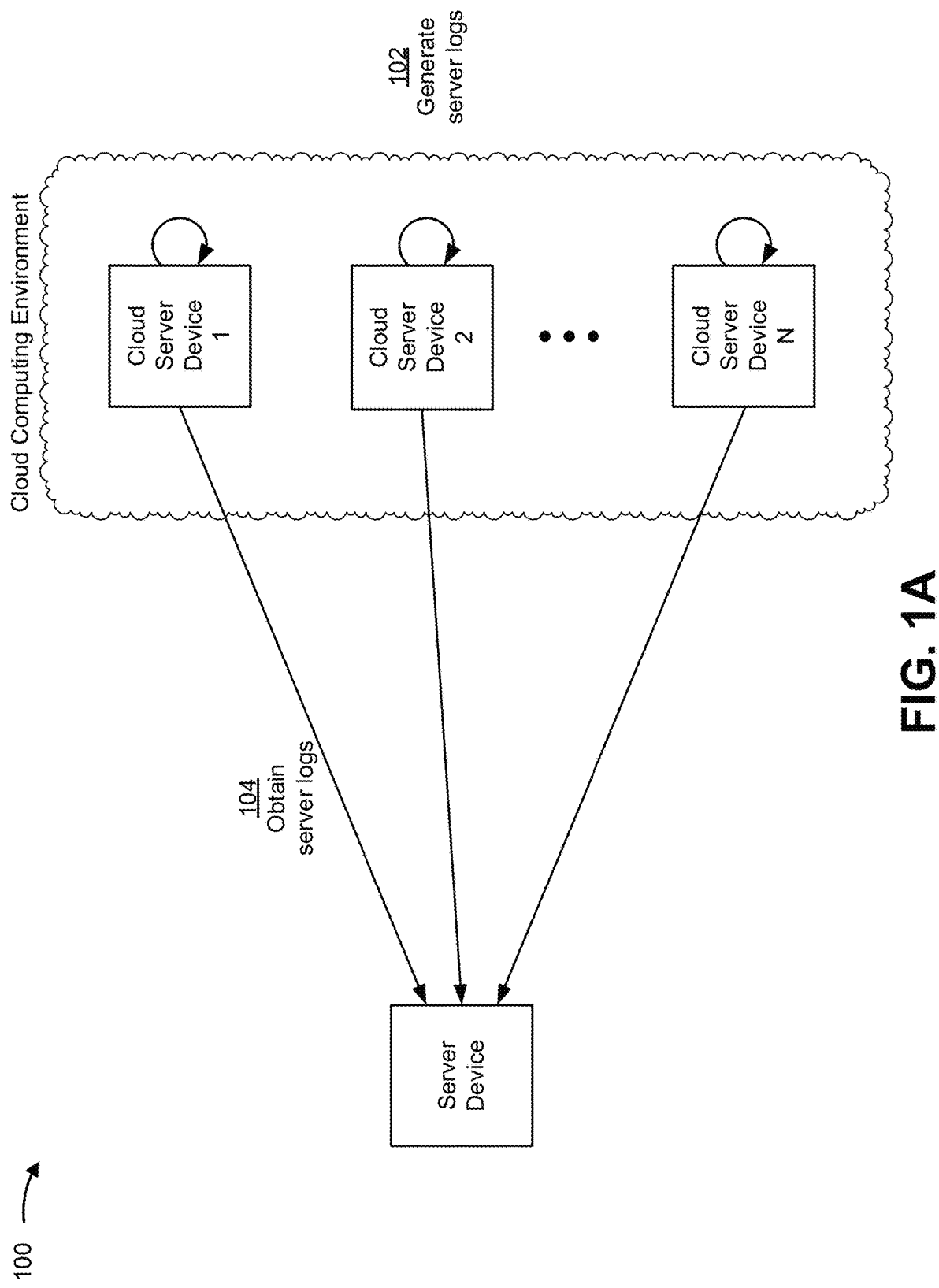

The following detailed description of example implementations refers to the accompanying drawings. The same reference numbers in different drawings can identify the same or similar elements.

A cloud computing environment includes a plurality of server devices to provide an application, a service, and/or the like. The plurality of servers handle multiple (e.g., tens, hundreds, thousands) actions, such as server requests, simultaneously. In many cases, the plurality of servers successfully handle the actions, but in other cases one or more servers of the plurality of servers experience one or more errors. The one or more errors often go unnoticed due to the high amount of traffic handled by the plurality of servers (e.g., millions of actions an hour). However, if the one or more errors are not addressed, underlying software and/or hardware issues of the one or more servers can create other errors that lead to meaningful, detrimental impacts to the cloud computing environment.

Some implementations described herein provide a server device that is capable of processing a plurality of server logs of a plurality of cloud server devices to identify one or more server errors, and determine a server error type of each server error of the one or more server errors. In some implementations, the server device can obtain the plurality of server logs from the plurality of cloud server devices and generate a plurality of data structures, where each data structure includes one or more log entries, of the plurality of server logs, that concern a server request. In some implementations, the server device can identify a set of data structures associated with one or more server errors and process the data structures using an artificial intelligence technique to determine a respective server error type of each data structure of the set of data structures. In some implementations, the server device can cause a client device to display information concerning at least one server error type associated with the set of data structures.

In this way, some implementations described herein can provide server managers with information about one or more server error types that are affecting a cloud environment. For example, the server device can cause display of information concerning at least one server error type, which may indicate that one or more cloud server devices is experiencing a software error and/or a hardware error. In this way, some implementations described herein provide server managers, as well as automated systems, with information that can be used to perform an action to address the at least one server error type. Moreover, some implementations may decrease a mean time to detect (MTTD) one or more server errors and/or one or more server error types, which would take longer to detect using traditional monitoring and testing functions (e.g., such as receiving communications from users regarding poor cloud environment functionality). This can result in a better user experience for users utilizing the cloud environment. This can also result in less wear-and-tear on components (e.g., less server throttling) related to supporting the cloud environment, which can reduce costs associated with maintaining the cloud environment.

Furthermore, implementations described herein are automated and can capture and process numerous (e.g., hundreds, thousands, millions, billions, and/or the like) data points to predict and/or determine a server error type. This can improve speed and efficiency of the process predict and/or determine a server error type and conserve computing resources (e.g., processor resources, memory resources, and/or the like) of the transaction monitoring platform that would otherwise be used to attempt to determine a server error type. Furthermore, implementations described herein use a rigorous, computerized process to perform tasks or roles that were not previously performed or were previously performed using subjective human intuition or input. For example, currently there does not exist a technique to automatically process a plurality of server logs of a plurality of cloud server devices to identify one or more server errors and determine a server error type of each server error of the one or more server errors.

FIGS. 1A-1F are diagrams of an example implementation 100 described herein. As shown in FIGS. 1A-1F, example implementation 100 can include a server device, one or more cloud server devices (shown as cloud server devices 1 through N, where N≥1), and/or a client device. Some example implementations described herein concern a single server device and/or a single client device, but some implementations can include a plurality of server devices and/or a plurality of client devices. In some implementations, the server device, the one or more cloud server devices, and/or the client device can be connected via a network, such as the Internet, an intranet, and/or the like.

As shown in FIG. 1A and by reference number 102, the one or more cloud server devices can generate a plurality of server logs. In some implementations, at least one cloud server device of the one or more cloud server devices can generate a server log. In some implementations, the server log can include information about activities performed by the at least one cloud server device. In some implementations, the server log can include a history of requests received by the at least one cloud server device, actions taken by the at least one cloud server device, errors encountered by the at least one cloud server device, and/or the like. In some implementations, the server log can include a plurality of log entries, where each log entry includes activity information, such as a request received by the at least one cloud server device, an action taken by the at least one cloud server device, an error encountered by the at least one cloud server device, and/or the like. For example, a log entry can include a request received by the at least one cloud server device, an identification of the at least one cloud server device, an identification of the requestor, an address of the requestor (e.g., an interne protocol (IP) address), a request date and/or time, an item and/or information requested, a method the requestor used to make the request (e.g., a "get," a "post," a "put," and/or the like command), a protocol the requestor used to make the request (e.g., a hypertext transfer protocol (HTTP)), a status code (e.g., a code that indicates the at least one cloud server device handled the request successfully or encountered a server error), and/or the like. In some implementations, the status code can indicate a successful processing of the request, a redirection server error, a server error caused by the requestor, a server error caused by the at least one cloud server device, and/or the like.

As shown by reference number 104, the server device can obtain the plurality of server logs. In some implementations, the server device can send a request to the at least one cloud server device of the one or more server devices for the server log of the at least one cloud server device. In some implementations, the server device can send the request on a scheduled basis (e.g., every 4 hours, every 24 hours, every week, every month, and/or the like), on an on-demand basis (e.g., upon the server device receiving an instruction from a user to send the request), on a triggered basis (e.g., upon the server device obtaining information that an application, service, and/or the like associated with the one or more cloud server devices is encountering performance issues), and/or the like. In some implementations, the at least one cloud server device, based on the request, can send the server log to the server device. In some implementations, the at least one cloud server device can send the server log to the server device on a scheduled basis (e.g., every 4 hours, every 24 hours, every week, every month, and/or the like), on an on-demand basis (e.g., upon the at least one cloud server device receiving an instruction from a user to send the request), on a triggered basis (e.g., upon the at least one cloud server device determining that the at least one cloud server device has encountered a threshold amount of server errors in a period of time), and/or the like.

Figure 1B:
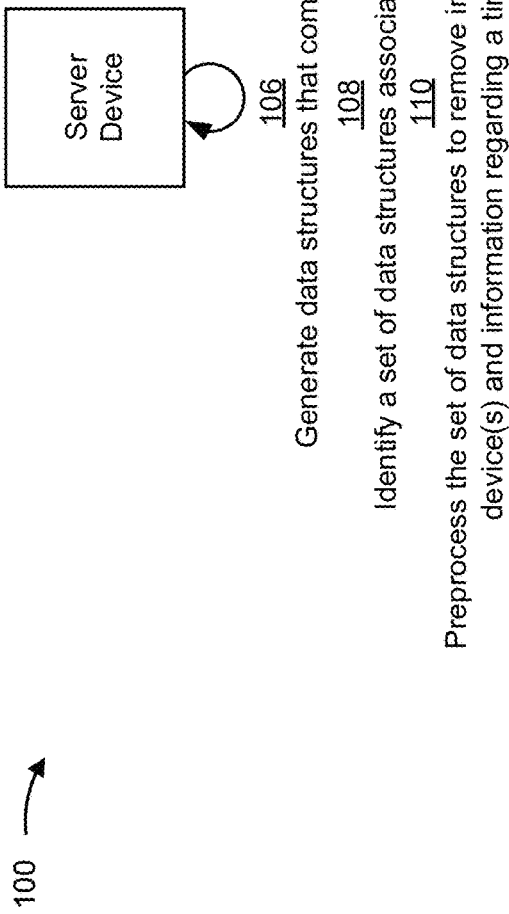

As shown in FIG. 1B and reference number 106, the server device can generate a plurality of data structures that compile the plurality of server logs. In some implementations, the server device can generate a plurality of data structures where each data structure includes one or more log entries of the plurality of server logs. In some implementations, the one or more log entries can concern a request received by the at least one cloud server device of the one or more cloud server devices. For example, the server device can generate a data structure that includes one or more log entries of the server log of the least one cloud server device that concern a particular request, such as a "get" request, sent to the at least one cloud server device.

As shown by reference number 108, the server device can identify a set of data structures, of the plurality of data structures, that are associated with one or more server errors of the one or more cloud server devices. In some implementations, the one or more server errors can include a redirection server error, a server error caused by the requestor, a server error caused by the at least one cloud server device, and/or the like. In some implementations, the server device can search the plurality of data structures for information that identifies the one or more server errors to identify the set of data structures that are associated with the one or more server errors. For example, the server device can search the plurality of data structures for status codes that indicate the one or more server errors to identify the set of data structures that are associated with the one or more server errors.

As shown by reference number 110, the server device can preprocess the set of data structures to remove information identifying the one or more server devices and/or time information regarding the one or more server errors. In some implementations, the server device can parse at least one data structure of the set of data structures to identify at least one log entry of the data structure that includes the information that identifies the one or more server errors. For example, the server device can parse the at least one data structure of the set of data structures to identify the at least one log entry that includes at least one status code that indicates the one or more server errors. In some implementations, the server device can filter the at least one log entry to remove the information that identifies the one or more server errors, information that identifies the at least one cloud server device, information that identifies a time associated with the one or more server errors, and/or the like. For example, the server device can filter the at least one log entry to remove the status code, the identification of the at least one cloud server device, the request date and/or time, and/or the like.

In some implementations, the server device can generate metadata that includes the information that identifies the one or more server errors, the information that identifies the at least one cloud server device, the information that identifies the time associated with the one or more server errors, and/or the like. In some implementations, the server device can cause the at least one data structure to be associated with the metadata.

Figure 1C:
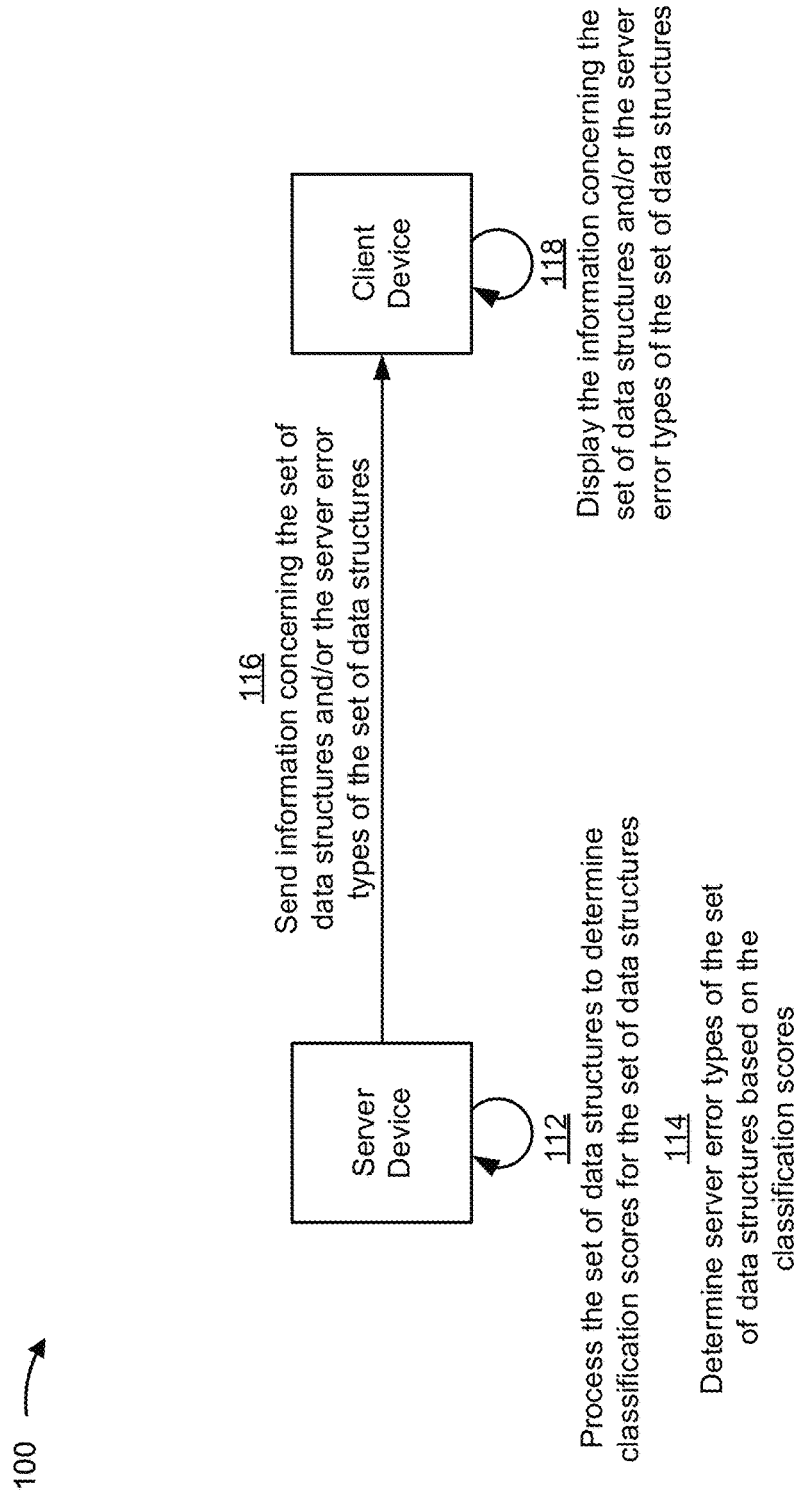

As shown in FIG. 1C and by reference number 112, the server device can process the set of data structures to determine classification scores for the set of data structures. In some implementations, the server device can process the set of data structures using an artificial intelligence technique to determine a respective classification score of each data structure of the set of data structures. For example, the server device can process the set of data structures using a term frequency-inverse document frequency technique to determine the respective classification score of each data structure of the set of data structures.

As shown by reference number 114, the server device can determine, based on the respective classification score of each data structure of the set of data structures, a respective server error type of each data structure of the set of data structures. In some implementations, a server error type can be a format error type, a queue disabled error type, a client structured query language (SQL) connection error type, a server SQL connection error type, a prediction error type, an internal server error type, a throttle error type, a stack overflow error type, a database connection issue error type, a database not responding error type, a request timeout error type, a server performance issue error type, a memory limit exceed error type, an "other" error type, and/or the like. In some implementations, a server error type can be associated with a software error, a hardware error, a combination software/hardware error, and/or the like. In some implementations, the server device can process the classification scores of the set of data structures to identify a group of data structures that have similar classification scores and determine a particular server error type based on the similar classification scores. The server device can assign the particular server error type to each data structure of the group of data structures that have similar classification scores.

In some implementations, the server device can use a machine learning model to process the set of data structures to determine the classification score and/or the server error type for each data structure of the set of data structures. In some implementations, the server device can generate, train, retrain, update, and/or the like the machine learning model using a machine learning technique.

For example, the server device can process historical data structure data (e.g., data concerning at least one data structure that was associated with the one or more or more server errors, that was preprocessed, that was determined to have a classification score, that was determined to have a server error type, and/or the like). In some implementations, the server device can process the historical data structure data to generate and/or train a machine learning model. In some implementations, the server device can process the historical data structure data to train the machine learning model to predict and/or determine a classification score and/or a server error type for a data structure.

In some implementations, the server device can perform a set of data manipulation procedures to process the historical data structure data to generate the machine learning model, such as a data preprocessing procedure, a model training procedure, a model verification procedure, and/or the like. For example, the server device can preprocess the historical data structure data to remove numbers and/or letters, non-ASCII characters, other special characters, white spaces, confidential data, and/or the like. In this way, the server device can organize thousands, millions, or billions of data entries for machine learning and model generation—a data set that cannot be processed objectively by a human actor.

In some implementations, the server device can perform a training operation when generating the machine learning model. For example, the server device can portion the historical data structure data into a training set, a validation set, a test set, and/or the like. In some implementations, the server device can train the machine learning model using, for example, an unsupervised training procedure and based on the training set of the data. In some implementations, the server device can perform dimensionality reduction to reduce the historical data structure data to a minimum feature set, thereby reducing processing to train the machine learning model, and can apply a classification technique to the minimum feature set.

In some implementations, the server device can use a logistic regression classification technique to determine a categorical outcome (e.g., that particular historical data structure data is associated with a particular classification score and/or a server error type). Additionally, or alternatively, the server device can use a naïve Bayesian classifier technique. In this case, the server device can perform binary recursive partitioning to split the data of the minimum feature set into partitions and/or branches, and use the partitions and/or branches to perform predictions (e.g., that particular historical data structure data is associated with a particular classification score and/or a server error type). Based on using recursive partitioning, the server device can reduce utilization of computing resources relative to manual, linear sorting and analysis of data points, thereby enabling use of thousands, millions, or billions of data points to train the machine learning model, which can result in a more accurate machine learning model than using fewer data points.

Additionally, or alternatively, the server device can use a support vector machine (SVM) classifier technique to generate a non-linear boundary between data points in the training set. In this case, the non-linear boundary is used to classify test data (e.g., particular historical data structure data) into a particular class (e.g., a class indicating that the particular historical data structure data is associated with a particular classification score and/or a server error type).

Additionally, or alternatively, the server device can train the machine learning model using a supervised training procedure that includes receiving input to the model from a subject matter expert, which can reduce an amount of time, an amount of processing resources, and/or the like to train the machine learning model relative to an unsupervised training procedure. In some implementations, the server device can use one or more other model training techniques, such as a neural network technique, a latent semantic indexing technique, and/or the like. For example, the server device can perform an artificial neural network processing technique (e.g., using a two-layer feedforward neural network architecture, a three-layer feedforward neural network architecture, and/or the like) to perform pattern recognition with regard to patterns of particular historical data structure data that is associated with a particular classification score and/or a server error type. In this case, using the artificial neural network processing technique can improve an accuracy of the machine learning model generated by the server device by being more robust to noisy, imprecise, or incomplete data, and by enabling the server device to detect patterns and/or trends undetectable to human analysts or systems using less complex techniques.

Accordingly, the server device can use any number of artificial intelligence techniques, machine learning techniques, deep learning techniques, and/or the like to determine a particular classification score and/or a particular server error type for a particular data structure.

As shown by reference number 116, the server device can send information concerning the set of data structures and/or the server error types of the set of data structures to the client device. In some implementations, the client device can obtain the information concerning the set of data structures and/or the server error types of the set of data structures to the client device from the server device. In some implementations, the server device can send information concerning the respective server error type of each data structure of the set of data structures to the client device and/or the client device can obtain the information concerning the respective server error type of each data structure of the set of data structures from the server device.

In some implementations, the server device can determine, based on the respective server error type of each data structure of the set of data structures, a set of most frequent server error types and a period of time associated with the set of most frequent server error types. In some implementations, the server device can determine a group of data structures of the set of data structures that are associated with the set of most frequent server error types and send information concerning the group of data structures, the set of most frequent server error types, and/or the period of time to the client device.

As shown by reference number 118, the client device can display the information concerning the set of data structures and/or the server error types of the set of data structures. In some implementations, the client device, based on obtaining the information concerning the set of data structures and/or the server error types of the set of data structures from the server device, can display the information concerning the set of data structures and/or the server error types of the set of data structures on a display of the client device. For example, the client device can display the information concerning the at least one server error type associated with the set of data structures.

In some implementations, the client device can display information concerning respective server error types of one or more data structures of the set of data structures that are associated with one or more software errors, one or more hardware errors, a combination of one or more software and hardware errors, and/or the like. In some implementations, the client device can display the information concerning the group of data structures, the set of most frequent server error types, and/or the period of time.

Figure 1E:
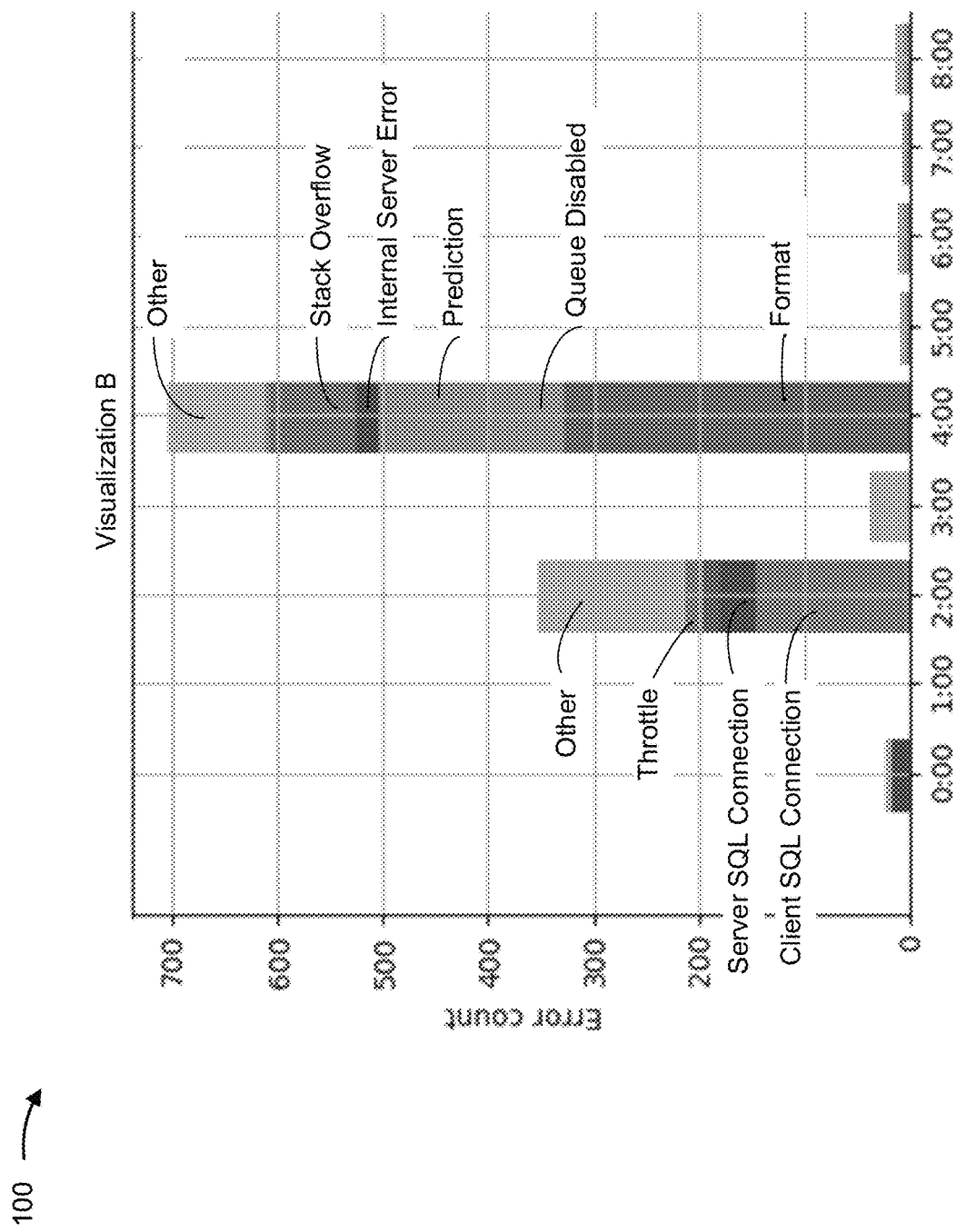

As shown by visualization A in FIG. 1D and visualization B in FIG. 1E, the client device can display the information concerning the set of data structures and/or the server error types of the set of data structures as a plot, such as a stacked bar diagram. In some implementations, the client device can display a number of server errors (e.g., an error count) for particular periods of time (e.g., hours, days, weeks, and/or the like) concerning one or more groups of error types. For example, as shown in visualization A, the client device can display a set of most frequent server error types (e.g., shown as a format error type, a queue disable error type, a client SQL connection error type, a server SQL connection error type, a prediction error type, an internal server error type, a throttle error type, a stack overflow error type, and an other error type) on a daily basis for a four day period (e.g., from Aug. 20, 2018 to Aug. 23, 2018). As another example, as shown in visualization B, the client device can display a set of most frequent server error types (e.g., shown as a format error type, a queue disable error type, a client SQL connection error type, a server SQL connection error type, a prediction error type, an internal server error type, a throttle error type, a stack overflow error type, and an other error type) on an hourly basis for a nine-hour period (e.g., from 0:00 to 8:00).

In some implementations, the client device can allow a user of the client device to interact with the display of the information concerning the set of data structures and/or the server error types of the set of data structures via a graphical interface of the client device. In some implementations, the user, via the graphical interface, can select a particular server error type and the client device can display information about particular data structures associated with the particular server error type and/or the metadata associated with the particular data structures. For example, the client device can display information about data structures associated with a selected server error type and the metadata information that identifies the at least one cloud server device associated with the data structures.

Figure 1F:
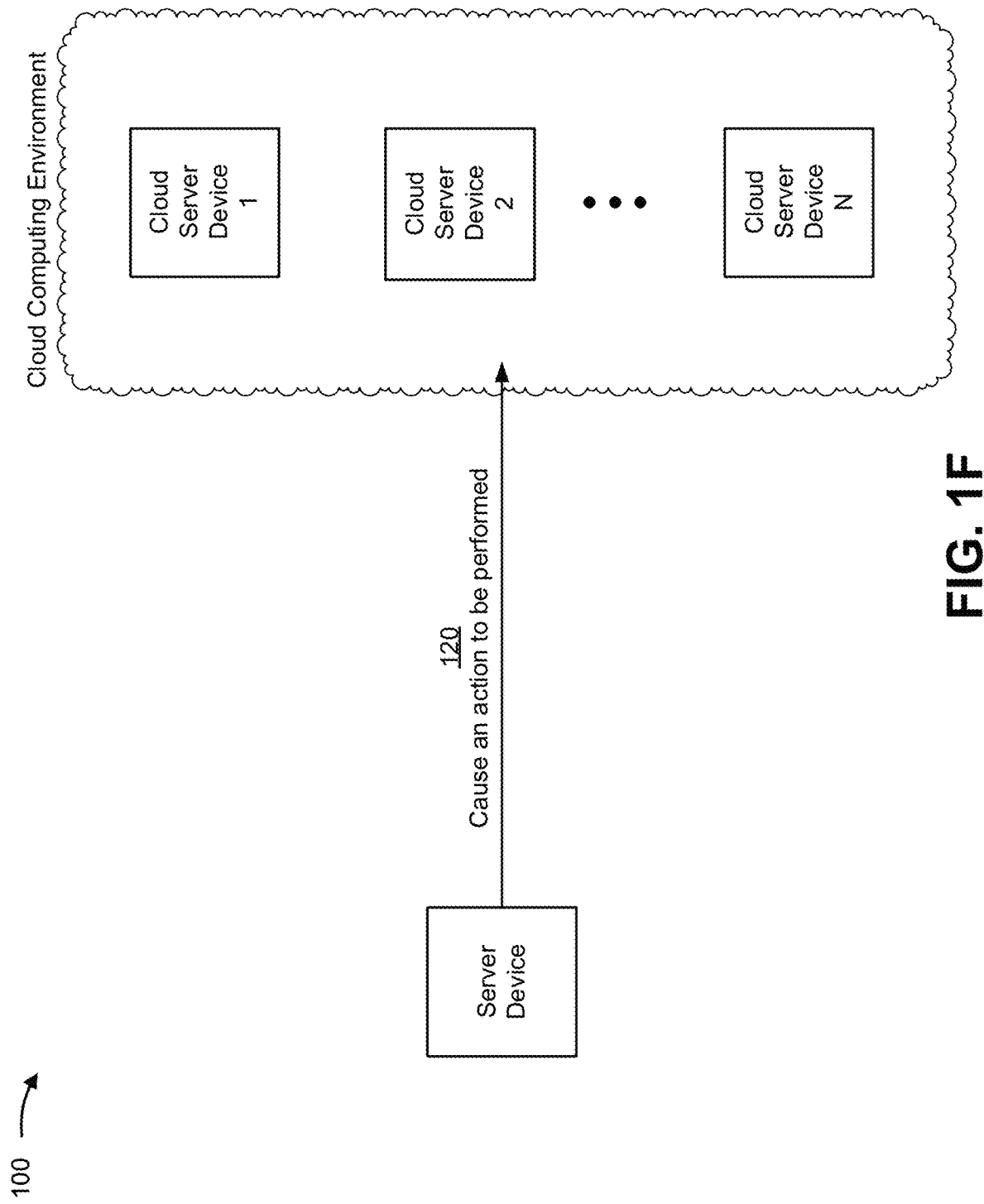

As shown in FIG. 1F and reference number 120, the server device can cause an action to be performed by at least one cloud server device of the one or more cloud server devices. In some implementations, the server device, based on the information concerning the set of data structures and/or the server error types of the set of data structures, can send a signal to the at least one cloud server device to perform the action. For example, the server device can cause the at least one cloud server device of the one or more cloud server devices to perform the action based on determining that a threshold amount of server errors of a server error type occurred during a time period. In some implementations, the server device can cause the at least one cloud server device to perform the action immediately after determining that the threshold amount of server errors of the server error type occurred during the time period. In some implementations, the at least one cloud server device can perform the action at a later time (e.g., on a scheduled basis, at a set hour, at a set day, at a set week, at a set month, and/or the like, on an on-demand basis, during a maintenance period of the at least one cloud server device, during a down time of the at least one cloud server device, and/or the like) after the server device determined that the threshold amount of server errors of the server error type occurred during the time period.

In some implementations, the action can include a software rollback action (e.g., rollback software to a prior version), a software removal action (e.g., an uninstall and/or deletion of software), a software upgrade action (e.g., a download and installation of a new software version), a software fix action (e.g., a download and installation of a software patch), a hardware reset action (e.g., reboot a poorly operating cloud server device), a hardware optimization action (e.g., rebalance overworked cloud server devices), a hardware recovery action (e.g., recover a cloud server device infected by a virus and/or subject to a hacking attack), a hardware addition action (e.g., add another cloud server device and/or bring a cloud server device online), a diagnostic action (e.g., perform a diagnostic test on a cloud server device), a maintenance request action (e.g., notify a technician to service a cloud server device), and/or the like. In some implementations, the server device can send one or more signals to the at least one cloud server device to perform the action. In some implementations, the at least one cloud server device can perform the action in response to receiving the one or more signals.

As indicated above, FIGS. 1A-1F are provided merely as an example. Other examples can differ from what was described with regards to FIGS. 1A-1F.

Figure 2:
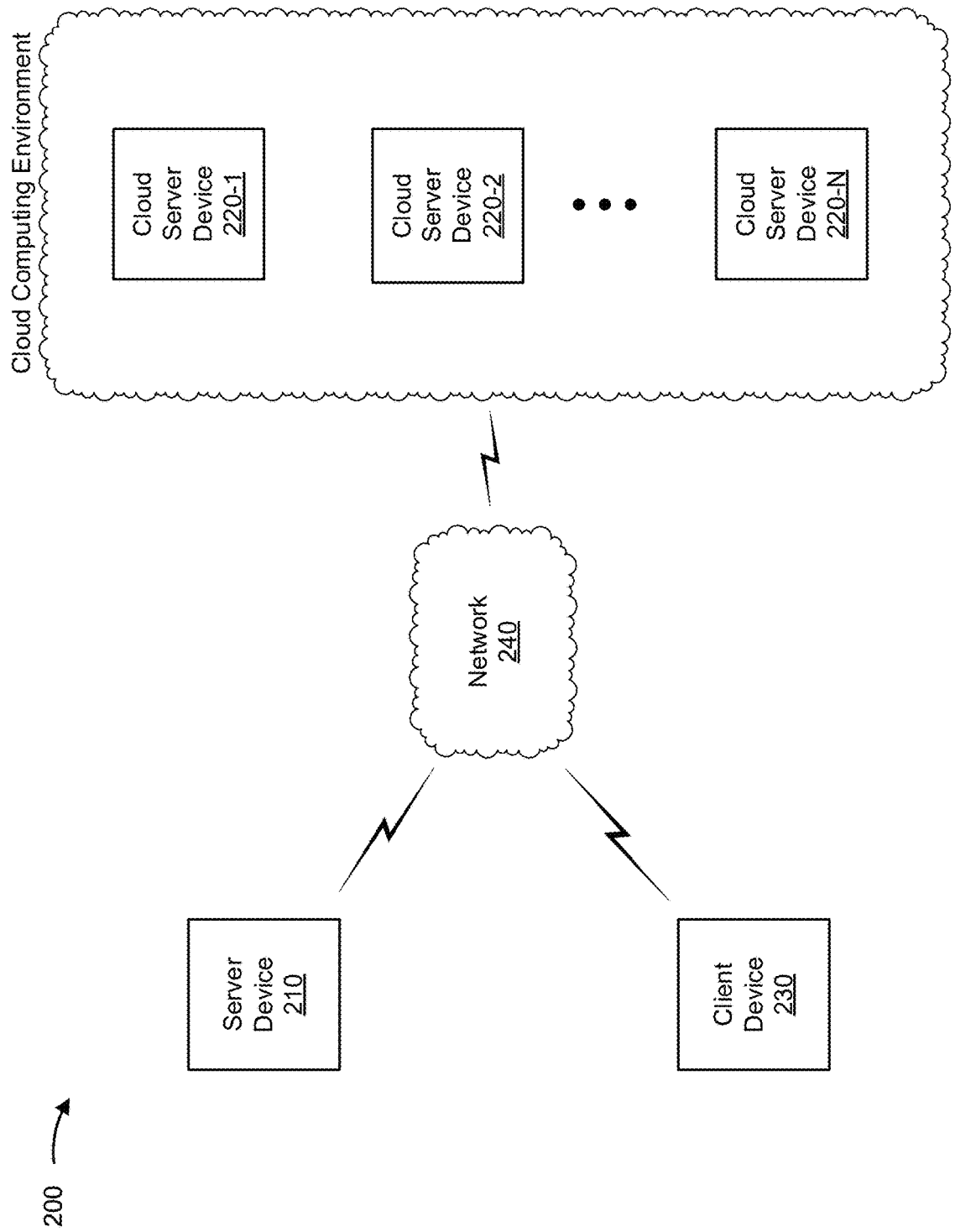
FIG. 2 is a diagram of an example environment in which systems and/or methods described herein can be implemented.

FIG. 2 is a diagram of an example environment 200 in which systems and/or methods, described herein, can be implemented. As shown in FIG. 2, environment 200 can include a server device 210, one or more cloud server devices 220-1 through 220-N (N≥1) (hereinafter referred to collectively as "cloud server devices 220" and/or individually as "cloud server device 220"), a client device 230, and a network 240. Devices of environment 200 can interconnect via wired connections, wireless connections, or a combination of wired and wireless connections.

Server device 210 includes one or more devices capable of receiving, storing, providing, generating, and/or processing information associated with determining server error types. For example, server device 210 can include a server device or a group of server devices (e.g., associated with a multi-server micro data center), a workstation computer or a group of workstation computers, a virtual machine (VM) or a group of virtual machines (VMs) implemented by one or more computing devices provided in a cloud computing environment, or a similar type or group of devices. In some implementations, server device 210 can obtain one or more server logs from cloud server device 220, generate data structures that include log entries included in the one or more server logs, process data structures associated with server errors to determine classification scores, determine server error types based on the respective classification scores, and cause client device 230 to display information associated with the server error types.

Cloud server device 220 includes one or more devices capable of receiving, storing, providing, generating, and/or processing information associated with generating server logs. For example, cloud server device 220 can include a server device or a group of server devices (e.g., associated with a multi-server micro data center), a workstation computer or a group of workstation computers, a virtual machine (VM) or a group of virtual machines (VMs) implemented by one or more computing devices provided in a cloud computing environment, or a similar type or group of devices. In some implementations, as shown in FIG. 2, cloud server device 220 can be hosted in a cloud computing environment. Notably, while implementations described herein describe cloud server device 220 as being hosted in a cloud computing environment, in some implementations, cloud server device 220 might not be cloud-based (i.e., might be implemented outside of a cloud computing environment) or might be partially cloud-based.

Client device 230 includes one or more devices capable of receiving, generating, storing, processing, and/or providing information associated with server error types. For example, client device 230 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 230 can receive information concerning server error types associated with data structures from server device 210. In some implementations, client device 230 can display the information concerning server error types.

Network 240 includes one or more wired and/or wireless networks. For example, network 240 can include a cellular network (e.g., a code division multiple access (CDMA) network, a 3G network, a 4G/LTE network, a 5G/NR network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
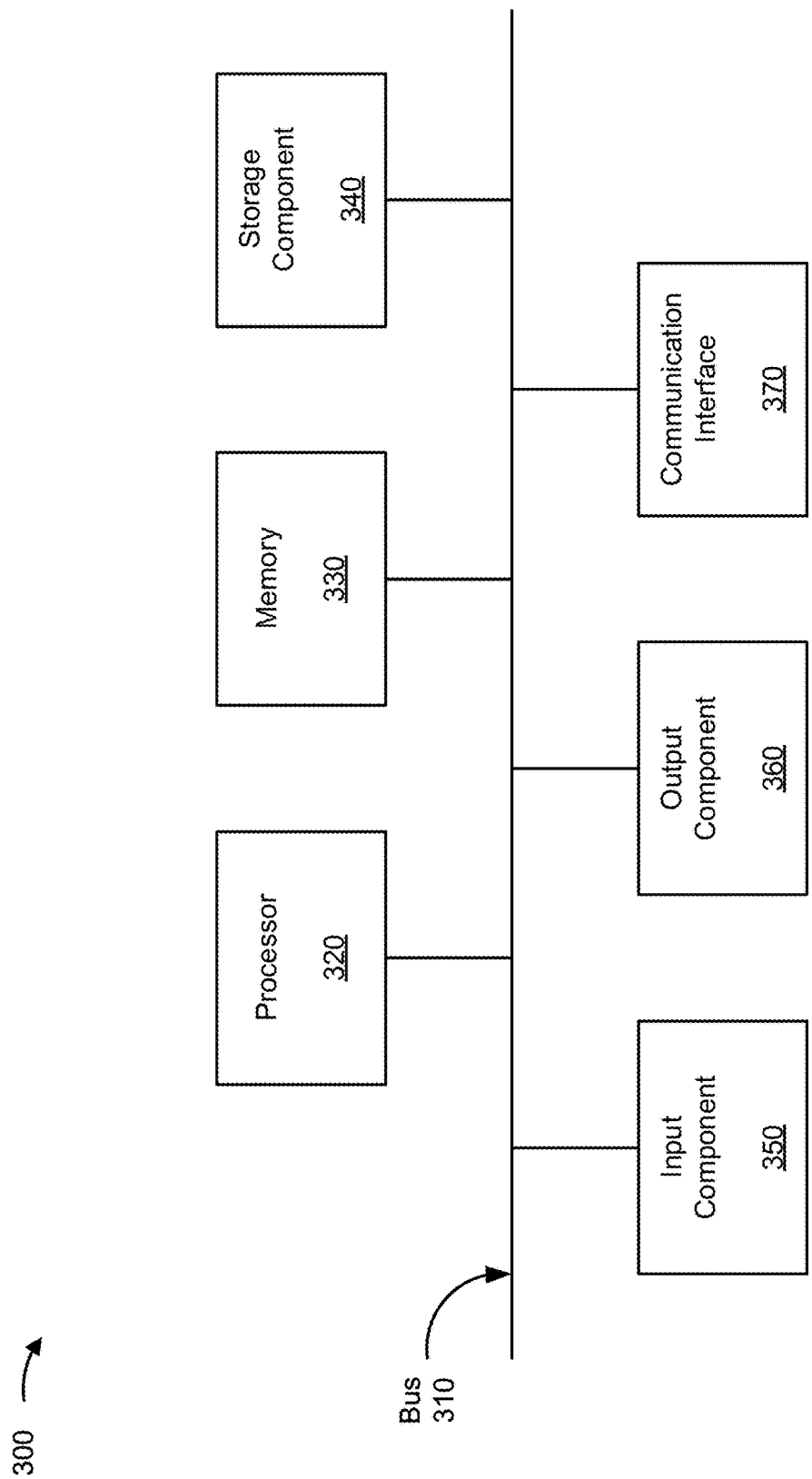
FIG. 3 is a diagram of example components of one or more devices of FIG. 2.

FIG. 3 is a diagram of example components of a device 300. Device 300 can correspond to server device 210, cloud server device 220, and/or client device 230. In some implementations, server device 210, cloud server device 220, and/or client device 230 can include one or more devices 300 and/or one or more components of device 300. As shown in FIG. 3, device 300 can include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, and/or a magneto-optic disk), a solid state disk, a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for determining server error types. In some implementations, one or more process blocks of FIG. 4 can be performed by a server device (e.g., server device 210). In some implementations, one or more process blocks of FIG. 4 can be performed by another device or a group of devices separate from or including the server device, such as cloud server device 220 and/or client device 230.

As shown in FIG. 4, process 400 can include obtaining a plurality of server logs from a plurality of servers, wherein each server log, of the plurality of server logs, includes a plurality of log entries (block 410). For example, the server device (e.g., using processor 320, memory 330, storage component 340, communication interface 370, and/or the like) can obtain a plurality of server logs from a plurality of servers, as described above in connection with FIGS. 1A-1F. In some implementations, each server log, of the plurality of server logs, can include a plurality of log entries.

As further shown in FIG. 4, process 400 can include generating, based on the plurality of log entries of the plurality of server logs, a plurality of data structures, wherein each data structure, of the plurality of data structures, includes one or more log entries of the plurality of log entries, of the plurality of server logs, that concern a server request (block 420). For example, the server device (e.g., using processor 320, memory 330, storage component 340, and/or the like) can generate, based on the plurality of log entries of the plurality of server logs, a plurality of data structures, as described above in connection with FIGS. 1A-1F. In some implementations, each data structure, of the plurality of data structures, can include one or more log entries of the plurality of log entries, of the plurality of server logs, that concern a server request.

As further shown in FIG. 4, process 400 can include identifying a set of data structures, of the plurality of data structures, associated with one or more server errors (block 430). For example, the server device (e.g., using processor 320, memory 330, storage component 340, and/or the like) can identify a set of data structures, of the plurality of data structures, associated with one or more server errors, as described above in connection with FIGS. 1A-1F.

As further shown in FIG. 4, process 400 can include processing the set of data structures using an artificial intelligence technique to determine a respective classification score of each data structure of the set of data structures (block 440). For example, the server device (e.g., using processor 320, memory 330, storage component 340, communication interface 370, and/or the like) can process the set of data structures using an artificial intelligence technique to determine a respective classification score of each data structure of the set of data structures, as described above in connection with FIGS. 1A-1F.

As further shown in FIG. 4, process 400 can include determining, based on the respective classification score of each data structure of the set of data structures, a respective server error type of each data structure of the set of data structures (block 450). For example, the server device (e.g., using processor 320, memory 330, storage component 340, and/or the like) can determine, based on the respective classification score of each data structure of the set of data structures, a respective server error type of each data structure of the set of data structures, as described above in connection with FIGS. 1A-1F.

As further shown in FIG. 4, process 400 can include causing display of information concerning the set of data structures and at least one server error type associated with the set of data structures (block 460). For example, the server device (e.g., using processor 320, memory 330, storage component 340, output component 360, communication interface 370, and/or the like) can cause display of information concerning the set of data structures and at least one server error type associated with the set of data structures, as described above in connection with FIGS. 1A-1F.

As further shown in FIG. 4, process 400 can include causing at least one server of the plurality of servers to perform an action concerning the at least one server error type (block 470). For example, the server device (e.g., using processor 320, memory 330, storage component 340, output component 360, communication interface 370, and/or the like) can cause at least one server of the plurality of servers to perform an action concerning the at least one server error type, as described above in connection with FIGS. 1A-1F.

Process 400 can include additional implementations, including any single implementation or any combination of implementations described below and/or in connection with one or more other processes described elsewhere herein.

In some implementations, the server device can parse a data structure of the set of data structures to identify one or more particular log entries of the data structure that include information that identifies at least one server error, can filter the one or more particular log entries to remove information that identifies a server, of the plurality of servers, associated with the at least one server error and a time associated with the at least one server error, can generate metadata that includes the information that identifies the server associated with the at least one server error and the time associated with the at least one server error, and can cause the data structure to be associated with the metadata.

In some implementations, when processing the set of data structures using the artificial intelligence technique to determine the respective classification score of each data structure of the set of data structures, the server device can process the set of data structures using a term frequency-inverse document frequency technique to determine the respective classification score of each data structure of the set of data structures.

In some implementations, when determining the respective server error type of each data structure of the set of data structures, the server device can process the classification scores of the set of data structures to identify a group of data structures that have similar classification scores, can determine a particular server error type based on the similar classification scores, and can assign the particular server error type to each data structure of the group of data structures.

In some implementations, when causing the display of the information concerning the set of data structures and the at least one server error type associated with the set of data structures, the server device can send information concerning the respective server error type of each data structure of the set of data structures to a client device, where the information concerning the respective server error type of each data structure of the set of data structures causes the client device to display information concerning a respective server error type of one or more data structures of the set of data structures that concern software errors.

In some implementations, when causing the display of the information concerning the set of data structures and the at least one server error type associated with the set of data structures, the server device can determine, based on the respective server error type of each data structure of the set of data structures, a set of most frequent server error types;

can determine, based on the respective server error type of each data structure of the set of data structures, a period of time associated with the set of most frequent server error types; can determine a group of data structures of the set of data structures that are associated with the set of most frequent server error types; and can cause display of information concerning the group of data structures, the set of most frequent server error types, and the period of time.

In some implementations, the action includes a software rollback action, a software removal action, a software upgrade action, a software fix action, a hardware reset action, a hardware optimization action, a hardware recovery action, a hardware addition action, a diagnostic action, and/or a maintenance request action.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term component is intended to be broadly construed as hardware, firmware, and/or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like, depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well-known "opt-in" or "opt-out" processes as can be appropriate for the situation and type of information. Storage and use of personal information can be in an appropriately secure manner reflective of the type of information (for example, through various encryption and anonymization techniques for particularly sensitive information).

It will be apparent that systems and/or methods described herein can be implemented in different forms of hardware, firmware, and/or a combination of hardware and software. The actual specialized control hardware, firmware, and/or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors configured to:
compile a plurality of server logs, from one or more servers, including a server log associated with two server error types of a plurality of server error types, wherein the two server error types include:
a hardware error, and
a software error;
identify, based on the compiling, one or more server errors associated with one or more server error types of the plurality of server error types;
determine, based on processing of a historical record associated with the one or more server errors, a respective classification score for each server error of the one or more server errors;
determine, based on the respective classification score and using a machine learning model, a respective server error type, of the plurality of server error types, for each server error of the one or more server errors,
wherein the machine learning model is trained based on performing dimensionality reduction to reduce historical structure data to a feature set; and
cause, based on the respective server error type, the one or more servers to perform an action concerning the respective server error type.

2. The device of claim 1, wherein the one or more processors are further configured to:
obtain the plurality of server logs.

3. The device of claim 2, wherein the one or more processors are further configured to:
send a request to obtain the plurality of server logs.

4. The device of claim 1, wherein each server log, of the plurality of server logs, further includes at least one of:
a history of requests received by at least one server of the one or more servers,
an action taken by at least one server of the one or more servers, or
an error encountered by at least one server of the one or more servers.

5. The device of claim 1, wherein the one or more processors are to:
preprocess the one or more server errors to remove at least one of identifier information identifying a corresponding server, server error type information identifying the one or more server error types, or time information regarding the one or more server errors.

6. The device of claim 5, wherein the one or more processors are to:
generate metadata, for each of the one or more server errors, that includes the at least one of the identifier information, the server error type information, or the time information; and
cause each of the one or more server errors to be associated with a respective metadata.

7. The device of claim 6, wherein the action includes displaying the respective server error type and the respective metadata of each of the one or more server errors.

8. The device of claim 1, wherein the one or more processors are further configured to:
cause display of information associated with the software error and/or the hardware error.

9. A non-transitory computer-readable storage medium storing instructions, the instructions comprising:
a plurality of instructions that, when executed by one or more processors, cause the one or more processors to:
compile a plurality of server logs, from one or more servers, including a server log associated with two server error types of a plurality of server error types, wherein the two server error types include:
a hardware error, and
a software error,
identify, based on the compiling, one or more server errors associated with one or more error types of the plurality of server error types,
determine, based on processing of a historical record associated with the one or more server errors, a respective classification score for each server error of the one or more servers,
determine, based on using a machine learning model and processing of the historical record and the respective classification score, a respective server error type, of the plurality of error types, for each server error of the one or more server errors,
wherein the machine learning model is trained based on performing dimensionality reduction to reduce historical structure data to a feature set, and
cause, based on the respective server error type, the one or more servers to perform an action concerning the respective server error type.

10. The non-transitory computer-readable storage medium of claim 9, wherein one or more instructions, of the plurality of instructions, that cause the one or more processors to determine the respective classification score, cause the one or more processors to:
determine, using an artificial intelligence technique and based on processing of the historical record, the respective classification score.

11. The non-transitory computer-readable storage medium of claim 9, wherein each server log, of the plurality of server logs, includes a plurality of log entries, and
wherein the plurality of instructions, when executed by the one or more processors, further cause the one or more processors to:
parse the one or more server errors to identify at least one log entry, of the plurality of log entries and associated with a particular server error of the one or more server errors, that include information that identifies at least one server error of the one or more server errors,
filter the at least one log entry to remove the information that identifies a server, of the one or more servers, associated with the at least one server error or information that identifies a time associated with the at least one server error,
generate metadata that includes the information that identifies the server associated with the at least one server error or the information that identifies the time associated with the at least one server error, and
cause the particular server error to be associated with the metadata.

12. The non-transitory computer-readable storage medium of claim 9, wherein one or more instructions, of the plurality of instructions, that cause the one or more processors to determine the respective server error type, cause the one or more processors to:
process the respective classification scores to identify a group of server errors that have similar classification scores,
determine a particular server error type based on the similar classification scores, and
assign the particular server error type to each server error of the group of server errors.

13. A method, comprising:
compiling, by a device, a plurality of server logs from one or more servers, including a server log associated with two server error types of a plurality of server error types,
wherein the two server error types include:
a hardware error, and
a software error;
identifying, by the device and based on the compiling, one or more server errors associated with one or more error types of the plurality of server error types;
determining, by the device and based on processing of a historical record associated with the one or more server errors and determined to have a particular classification score, a respective classification score for each of the one or more server errors;
determining, by the device and based on using a machine learning model and based on the respective classification score, a respective server error type, of the plurality of server error types, for each server error of the one or more server errors,
wherein the machine learning model is trained based on performing dimensionality reduction to reduce historical structure data to a feature set; and
causing, by the device and based on the respective server error type, the one or more servers to perform an action concerning the respective server error type.

14. The method of claim 13, wherein the action includes at least one of:
a software rollback action;
a software removal action;
a software upgrade action;
a software fix action;
a hardware reset action;
a hardware optimization action;
a hardware recovery action;
a hardware addition action;
a diagnostic action; or
a maintenance request action.

15. The method of claim 13, wherein causing the action comprises:
causing the action to occur at a later time.

16. The method of claim 13, wherein causing the action comprises:
causing another device to perform the action.

17. The method of claim 13, further comprising:
determining that a threshold amount of server errors of the respective server error type occurred during a period of time provided to perform the action.

18. The method of claim 17, further comprising:
causing display of information concerning the one or more server errors and at least one server error type associated with the one or more server errors.

19. The method of claim 18, wherein causing display of information comprises:
sending information concerning the respective server error type of each server error to a client device,
wherein the information concerning the respective server error type of each server error causes the client device to display information concerning the respective server error type of each server error.

20. The method of claim 18, wherein causing display of information comprises:
determining, based on the respective server error type, a set of most frequent server error types and a period of time associated with the set of most frequent server error types;
determining a group of server errors, of the one or more server errors, that are associated with the set of most frequent server error types; and
causing display of information concerning the group of server errors, the set of most frequent server error types, and the period of time.

\* \* \* \* \*